United States Patent Office 3,025,297
Patented Mar. 13, 1962

3,025,297
AMINOALKYL ESTERS OF 3,4,5-TRIHALO-
BENZOIC ACIDS
Richard A. Robinson, Evanston, Ill., assignor to G. D.
Searle & Co., Chicago, Ill., a corporation of Delaware
No Drawing. Filed Dec. 1, 1959, Ser. No. 856,370
5 Claims. (Cl. 260—268)

The present invention is related to novel aminoesters and, more particularly, to aminoalkyl esters of 3,4,5-trihalobenzoic acids, as represented by the structural formula

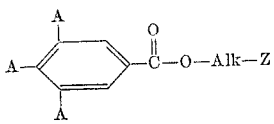

wherein A is selected from the group consisting of chlorine and bromine, Alk is a lower alkylene radical of at least 2 carbon atoms, and Z is selected from the group consisting of dialkylamino radicals of the structural formula

—NR$_2$ wherein R is a lower alkyl radical, and heterocyclic amino radicals of the structural formula

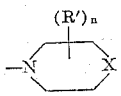

wherein X is selected from the group consisting of methylene and imino radicals; R′ is selected from the group consisting of hydrogen and lower alkyl radicals, optionally hydroxylated; and $n$ is a positive integer less than 3.

The lower alkyl radicals represented in R and Z are typified by methyl, ethyl, propyl, butyl, pentyl, hexyl, and the branched-chain isomers thereof. Lower alkylene radicals encompassed by Alk are, for example, ethylene, trimethylene, tetramethylene, pentamethylene, and the branched-chain isomers thereof.

The compounds of this invention can be manufactured by treating an ω-bromoalkyl 3,4,5-trihalobenzoate with the appropriate secondary amine. As a specific example, β-bromoethyl 3,4,5-trichlorobenzoate is reacted with piperazine in acetone solution to afford β-piperazinoethyl 3,4,5-trichlorobenzoate.

An alternate process for the production of the instant compounds is reaction of the 3,4,5-trihalobenzoic acid with the appropriate ω-haloalkylamine. For instance, 3,4,5-trichlorobenzoic acid is treated with N-(2-chloroethyl)-2,6-dimethylpiperidine in chloroform to afford 2-(2,6-dimethylpiperidino)ethyl 3,4,5-trichlorobenzoate.

The amino-esters described herein form non-toxic salts with a variety of inorganic and strong organic acids, for example, sulfuric, hydrochloric, hydrobromic, hydriodic, phosphoric, sulfamic, citric, lactic, maleic, succinic, tartaric, acetic, benzoic, and ascorbic. They also form quaternary ammonium salts with a variety of organic esters of sulfuric, hydrohalogen, and aromatic sulfonic acids. Typical esters suitable for this purpose are methyl iodide, ethyl chloride, propyl bromide, butyl bromide, benzyl chloride, dimethyl sulfate, ethyl toluenesulfonate, ethylene bromohydrin, propylene chlorohydrin, allyl chloride, and crotyl bromide.

The compounds of this invention are useful as a result of their valuable pharmacological properties. They are, for example, hypotensive agents and central nervous system depressants.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

Example 1

A mixture of 45 parts of 3,4,5-trichlorobenzoic acid, 40 parts of N-(2-chloroethyl)diisopropylamine, and 400 parts of chloroform is heated gently on the steam bath for about 2½ hours, allowing the solvent to distil. The residue is cooled and stirred with about 300 parts of ether to induce crystallization of the product. The crystalline material is recrystallized from chloroform, then washed with acetone, resulting in pure 2-(N,N-diisopropylamino)-ethyl 3,4,5-trichlorobenzoate hydrochloride, M.P. 195°.

Example 2

A mixture of 45 parts of 3,4,5-trichlorobenzoic acid, 36.6 parts of N-(3-chloropropyl)diethylamine, and 400 parts of chloroform is allowed to react by the process of Example 1. The residue is triturated with ether and recrystallized from chloroform to produce 3-diethylaminopropyl 3,4,5-trichlorobenzoate hydrochloride.

Example 3

A mixture of 45 parts of 3,4,5-trichlorobenzoic acid, 43 parts of N-(2-chloroethyl)-2,6-dimethylpiperidine, and 400 parts of chloroform is allowed to react under the conditions described in Example 1. The crude product is recrystallized from methanol-ether to afford pure 2-(2,6-dimethylpiperidino)ethyl 3,4,5-trichlorobenzoate hydrochloride, M.P. 211°.

Example 4

A mixture of 71.6 parts of 3,4,5-tribromobenzoic acid, 50 parts of N-(2-chloroethyl)-2,6-diethylpiperidine, and 500 parts of chloroform is heated on the steam bath according to the procedure described in Example 1. The residue is triturated with ether, then recrystallized from chloroform to afford 2-(2,6-diethylpiperidino)ethyl 3,4,5-tribromobenzoate hydrochloride.

Example 5

A solution of 30 parts of piperazine in warm acetone is mixed with 10 parts of β-bromoethyl 3,4,5-trichlorobenzoate dissolved in 100 parts of acetone, and the mixture heated at reflux for about 2 hours. Distillation of about ⅔ of the solvent results in precipitation of piperazine hydrochloride, which is removed by filtration. The filtrate is heated further in vacuo to remove the remainder of the acetone and also the excess piperazine. Trituration of the residue with water results in crystallization of the product, which is collected by filtration and washed with water. Treatment of this free base, β-piperazinoethyl 3,4,5-trichlorobenzoate, with propanolic hydrogen chloride affords the crude hydrochloride, which is recrystallized from methanol to yield pure β-piperazinoethyl 3,4,5-trichlorobenzoate dihydrochloride (containing one mole of crystallization of methanol), M.P. 225°.

Example 6

A mixture of 68 parts of β-bromoethyl 3,4,5-trichlorobenzoate, 60 parts of 1-(2-hydroxyethyl)piperazine, and 500 parts of acetone is heated at reflux for about 5 hours, then cooled and filtered to remove the precipitated 1-(2-hydroxyethyl)piperazine hydrobromide. The filtrate is heated in vacuo to remove the solvent and excess 1-(2-hydroxyethyl)piperazine. The residue is dissolved in ether and the ether solution washed with water, dried over anhydrous potassium carbonate, and treated with propanolic hydrogen chloride. The hydrochloride is recrystallized from methanol to yield pure 2-[4-(2-hydroxyethyl)piperazino]ethyl 3,4,5-trichlorobenzoate dihydrochloride, M.P. 240°.

*Example 7*

A mixture of 68 parts of γ-bromopropyl 3,4,5-trichlorobenzoate, 66.4 parts of 1-(3-hydroxypropyl)piperazine, and 500 parts of acetone is heated at reflux for about 5 hours, then "worked-up" according to the process described in Example 6. Treatment of the isolated free base with propanolic hydrogen chloride, followed by crystallization of the precipitated hydrochloride from methanol results in 3-[4-(3-hydroxypropyl)piperazino]propyl 3,4,5-trichlorobenzoate dihydrochloride.

*Example 8*

A mixture of 34 parts of β-bromoethyl 3,4,5-trichlorobenzoate, 23.1 parts of 1-methylpiperazine, and 300 parts of acetone is heated at reflux for about 5 hours. The product is isolated according to the procedure of Example 6, then recrystallized from methanol to afford 2-(4-methylpiperazino)ethyl 3,4,5-trichlorobenzoate dihydrochloride.

By substituting 26.3 parts of 1-ethylpiperazine and otherwise proceeding according to the herein-described processes, 2-(4-ethylpiperazino)ethyl 3,4,5-trichlorobenzoate dihydrochloride is obtained.

What is claimed is:
1. A compound of the structural formula

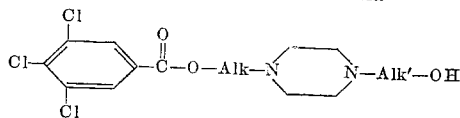

wherein Alk and Alk' are lower alkylene radicals of at least 2 carbon atoms.

2. 2-[4-(2-hydroxyethyl)piperazino]ethyl 3,4,5-trichlorobenzoate.

3. β-Piperazinoethyl 3,4,5-trichlorobenzoate.

4. A compound of the structural formula

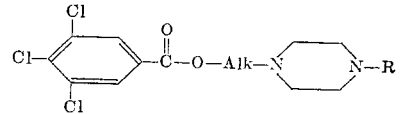

wherein Alk is a lower alkylene radical of at least 2 carbon atoms and R is selected from the group consisting of hydrogen, lower alkyl, and hydroxy(lower alkyl) radicals.

5. A compound of the structural formula

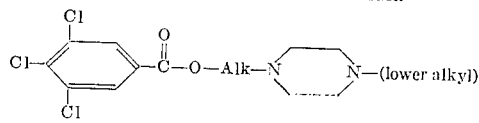

wherein Alk is a lower alkylene radical of at least 2 carbon atoms.

References Cited in the file of this patent

UNITED STATES PATENTS

| | | |
|---|---|---|
| 2,606,205 | Shelton et al. | Aug. 5, 1952 |
| 2,654,751 | Rhodehamel | Oct. 5, 1953 |
| 2,935,525 | Debus | May 3, 1960 |

OTHER REFERENCES

Moore: Jour. of Amer. Pharm. Assoc., vol. 33, pages 195–204 (1944).

McElvain et al.: Jour. Amer. Chem. Soc., vol. 68, pages 2592–2600 (1946).